No. 855,806. PATENTED JUNE 4, 1907.
M. PIEPER.
SKITTLE.
APPLICATION FILED OCT. 15, 1906.

Witnesses
Frieda Janzen

Inventor
Matthias Pieper

UNITED STATES PATENT OFFICE.

MATTHIAS PIEPER, OF BLANKENESE, GERMANY.

SKITTLE.

No. 855,806.

Specification of Letters Patent.

Patented June 4, 1907.

Application filed October 15, 1906. Serial No. 339,126.

*To all whom it may concern:*

Be it known that I, MATTHIAS PIEPER, a subject of the King of Prussia, and a resident of No. 16 Friedrichstrasse, Blankenese, in the Empire of Germany, have invented new and useful Improvements in Skittles, of which the following is a specification.

The present invention has reference to skittles which are provided with a spring-influenced ball, housed in a suitable bearing and protruding partly from the bottom surface for the purpose of entering a corresponding socket in the stand or supporting base for the skittles, so as to insure and guarantee the proper setting up and co-relative position of the latter.

Special objects of the invention are to render more efficient serviceable and durable in operation devices of the kind referred to.

With these ends in view the invention consists in the novel combination, arrangement and adaptation of parts, all as more fully hereinafter explained, shown in the accompanying drawings and then specifically set out in the appended claim.

Figure 1:
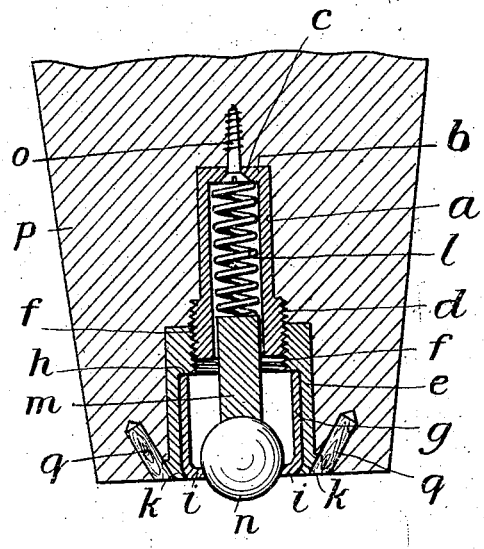
Figure 2:
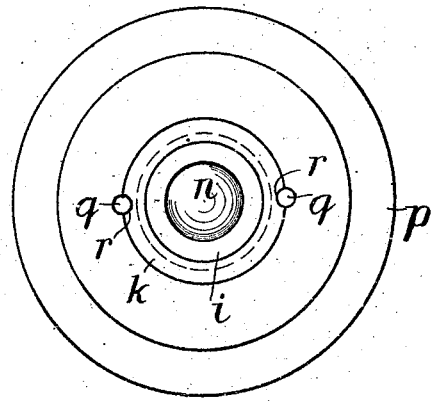

In the annexed drawings Figure 1 shows a central vertical section through the bottom part of a skittle. Fig. 2 is an inverted plan view of the same.

My invention comprises the following component parts, which are constructed and assembled in the following manner.

A cylinder $a$ closed at its top end by a lid $b$ having a screw hole $c$, is externally screw-threaded at the lower open end as indicated by the reference letter $d$. A tubular boss $e$ provided with female screw threads $f$ at its top end is secured on the cylinder $a$. The tubular boss $e$ is destined to receive a cup-shaped shell $g$ which snugly fits the internal surface of the boss $e$ and abuts against the step portion $h$ leading to the screw-threaded top portion $f$ when the marginal cup edge $i$ registers with the bottom edge $k$ of the boss $e$. A coiled spring $l$ is inserted into the cylinder $a$, said spring being adapted to press against a piston $m$ which is rectilineally guided in the cylinder $a$ and protrudes into the boss $e$ and shell $g$. The spring-influenced piston $m$ acts upon a ball $n$ placed into the cup-shell $g$, when the latter is inserted in the boss $e$ and when the boss $e$ is screwed to the cylinder $a$ as shown in Fig. 1. Under the pressure of the spring-influenced piston $m$ the ball $n$ is forced into a hole in the cup edge $i$ and projects therefrom to the required extent.

It is obvious that the hole must be of smaller diameter than the diameter of the ball, to secure the latter in the cup $g$. In the lower portion of the skittle $p$ is provided in any suitable manner a concentric cavity which opens toward the bottom surface and which is preferably but not necessarily step-like reduced in conformity with the external configuration of the cylinder $a$ and boss $e$ when screwed together.

The cylinder $a$ is inserted in the central inner portion of the cavity and secured in place by a screw $o$ driven through the screw hole $c$ in the lid $b$ into the substance of the skittle $p$. The boss $e$ is thereupon screwed on the cylinder $a$ until its lower marginal edge $k$ registers with the bottom surface of the skittle. The ball bearing can now be completed by the insertion of the spring $l$, piston $m$, shell $g$ and ball $n$ as previously described. The connection between the boss $e$ and shell $g$ is preferably secured by swaging by means of a suitable implement the marginal edge $k$ at one or more places onto the cup edge $i$.

In order to hold the boss $e$ against rotation in the skittle two or more wooden plugs $q$ are driven into previously prepared holes in the bottom surface of the skittle in such a manner that the boss $e$ is wedged in its place. It may be advantageous to provide indentations $r$ in the marginal edge $k$ of the boss $e$ as a bearing for the wedging plugs $q$.

The improved ball bearing facilitates the removal and interchange of the various component parts by boring out the wooden plugs $q$. The indentations $r$ in the boss $e$ admit of the employment of a fork spanner in unscrewing the boss.

The arrangement of a rectilineally guided and spring-influenced piston acting upon the ball insures the proper working position of the ball when setting up the skittles. A spherical hole in the abutment surface of the piston $m$ prevents the ball $n$ from lateral movement, when being pressed home into the shell $g$.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variation and modification as properly falls within the scope of my invention and the terms of the following claim.

What I do claim as my invention, and desire to secure by Letters Patent, is:

The combination with skittles having a spring-influenced ball protruding centrally from their under face, of a bearing for the ball, comprising a cylinder $a$, a boss $e$ adapted to be screwed onto the said cylinder $a$, a cup-shaped shell $g$ adapted to be received and secured in the aforesaid boss $e$, a spring $l$, a piston $m$ acted upon by the spring $l$ and rectilineally guided in the cylinder $a$, a ball $n$ inside the cup-shaped shell $g$ acted upon by the spring-influenced piston $m$ so as to protrude partially through a central hole in the cup-shaped shell $g$, and means for securing the aforesaid bearing in a central cavity in the underface of the skittles, substantially as described and shown and for the purposes set forth.

In witness whereof I have hereunto signed my name this 13th day of September 1906, in the presence of two subscribing witnesses.

MATTHIAS PIEPER.

Witnesses:
OTTO W. HELLMRICH,
IDA HAFERMANN.